United States Patent [19]

Straub et al.

[11] Patent Number: 5,526,523
[45] Date of Patent: Jun. 11, 1996

[54] INTERFACE BETWEEN OPERATING SYSTEM AND OPERATING SYSTEM EXTENSION

[75] Inventors: Eric Straub, Kirkland; Mike Dryfoos, Bothell, both of Wash.

[73] Assignee: Microsoft Corporation, Redmond, Wash.

[21] Appl. No.: 315,855

[22] Filed: Sep. 30, 1994

Related U.S. Application Data

[63] Continuation of Ser. No. 847,457, Mar. 6, 1992, abandoned.
[51] Int. Cl.⁶ .................................................. G06F 9/00
[52] U.S. Cl. ...................... 395/700; 395/500; 395/375; 364/DIG. 1; 364/DIG. 2
[58] Field of Search .................................. 395/700, 650, 395/500

[56] References Cited

U.S. PATENT DOCUMENTS

| | | | |
|---|---|---|---|
| 4,530,052 | 7/1985 | King | 395/700 |
| 4,626,986 | 12/1986 | Mori | 395/700 |
| 4,779,187 | 10/1988 | Letwin | 395/725 |
| 4,835,677 | 5/1989 | Sato | 395/700 |
| 4,926,322 | 5/1990 | Stimae et al. | 395/425 |
| 5,138,713 | 8/1992 | Loten | 395/725 |
| 5,157,663 | 10/1992 | Major | 371/9.1 |

FOREIGN PATENT DOCUMENTS

| | | | |
|---|---|---|---|
| 0498130A2 | 12/1991 | European Pat. Off. | G06F 9/44 |
| 0498130A3 | 12/1991 | European Pat. Off. | G06F 9/44 |

OTHER PUBLICATIONS

DOS Extender Old and New, by Duncan, Ray, P.C. Magazine Feb. 26, 1991 V10 N4 p. 385 (5).
Out of Memory? By Lloyd, Mark Morgan Exe. Mar. 1990. V4 N9 p(50) (4).
Gateways to Protected Mode by Glass, 1990 Byte publication pp. 287–295.
The DOS Protected Mode Interface by Glass, 1990 publication, pp. 113–118.
DOS unbound Users of Protected Mode by Schulman 1990, publication, pp. 250–256.
M.S. DOS Programming by Duncan, Microsoft Press, pp. 389–390, 1988.
IBM Technical Disclosure Bulletin; vol. 34, No. 7A; Dec. 1991; pp. 489—paragraph 2 and p. 490—paragraph 1.

*Primary Examiner*—Parshotam S. Lall
*Assistant Examiner*—Zarni Maung
*Attorney, Agent, or Firm*—Seed and Berry

[57] ABSTRACT

A method for interfacing an operating system extension with a personal computer includes the step of providing a function command to the operating system of the personal computer when the operating system extension performs a function typically performed by the operating system of the personal computer. The operating system of the personal computer responds to the function command to perform functions unique to the operating system of the personal computer so that the application program will execute properly. As an example, when an application program is being loaded by an operating system extension, the operating system of the personal computer responds to the function command by revising the application program so that the application program will be compatible with the personal computer.

4 Claims, 3 Drawing Sheets

INTERFACE BETWEEN OPERATING SYSTEM AND OPERATING SYSTEM EXTENSION

CROSS-REFERENCE TO RELATED APPLICATION

This application is a continuation of U.S. patent application Ser. No. 07/847,457, filed Mar. 6, 1992, now abandoned.

TECHNICAL FIELD

The present invention is directed toward a method for loading programs and, more particularly, toward a method for loading programs using an operating system extension.

BACKGROUND OF THE INVENTION

Most personal computers include a microprocessor or other data processing device for executing application programs, a disk drive for substantially permanent storage of application programs, computer memory for storing the application programs when they are being executed, and an operating system for interfacing the application programs with the computer. The application programs are typically stored on a fixed storage medium, such as a floppy disk or the disk drive of the personal computer, for access by the computer. To execute the application program, the user loads the application program into the computer memory, where it can be accessed more quickly by the computer. In these systems the application program is loaded into the computer memory by the operating system of the computer.

However, personal computers can be configured in a manner such that the application program is loaded by an operating system distinct from that of the personal computer for execution by the operating system of the personal computer. These configurations include operating system extensions that are provided for interfacing the operating system of the personal computer with a resource. In some cases, the operating system extensions will load their own application programs. As examples, networking systems include operating system extensions that load a certain class of application programs. As another example, memory managers include operating system extensions that load certain application programs.

In the configuration of a personal computer with an operating system extension, the operating system of the personal computer has no opportunity to perform functions associated with the loading of the application program into the memory space of the operating system extension. Accordingly, functions that are associated with the loading of an application program and are unique to the operating system of the computer cannot be performed. Since the performance of these functions may be necessary for proper operation of the application program with the computer, it is desirable to provide method for enabling the operating system of a computer to perform these functions when an application program is being loaded into the memory space of an operating system extension.

More particularly, some application programs must be revised to enable the application program to operate properly with the configuration of the computer. One manner of revision is to associate a version number of the operating system of the personal computer with the application program so that the application program will recognize the operating system. Another manner of revision is to replace predetermined instructions and data of the application program with alternate instructions and data so that the application program is compatible with a personal computer configured with the operating system stored in the high memory area (HMA). These revisions, and the reasons therefor, are discussed in greater detail in U.S. patent application Ser. No. 07/847,525, entitled *Method For Storing Programs,* by Eric Straub et al., filed Mar. 6, 1992 (concurrently herewith), the disclosure of which is incorporated herein by the foregoing reference thereto.

Accordingly, it is desirable to provide a method for enabling the operating system of a personal computer to revise an application program when it is stored in the memory space of an operating system extension.

SUMMARY OF THE INVENTION

The present invention is a method for interfacing an operating system extension with a computer wherein the operating system extension is constructed for executing an application program and wherein the computer includes an operating system. The method includes the step of providing a function command to the operating system of the computer to identify the performance of a predetermined function by the operating system extension on the application program. The method further includes the step of responding to the function command to perform any functions unique to the operating system of the computer for proper execution of the application program.

In one present embodiment of the invention, the operating system extension includes an address space for loading the application program, the method further includes the step of loading the application program into the address space of the operating system extension to create an image of the application program. The function command is provided to the operating system of the computer to indicate that the operating system extension has loaded the application program into its address space. In another embodiment of the invention, the computer responds to the function command to revise the image of the application program so that the application program will execute properly with the computer.

DETAILED DESCRIPTION OF THE INVENTION

Figure 1:
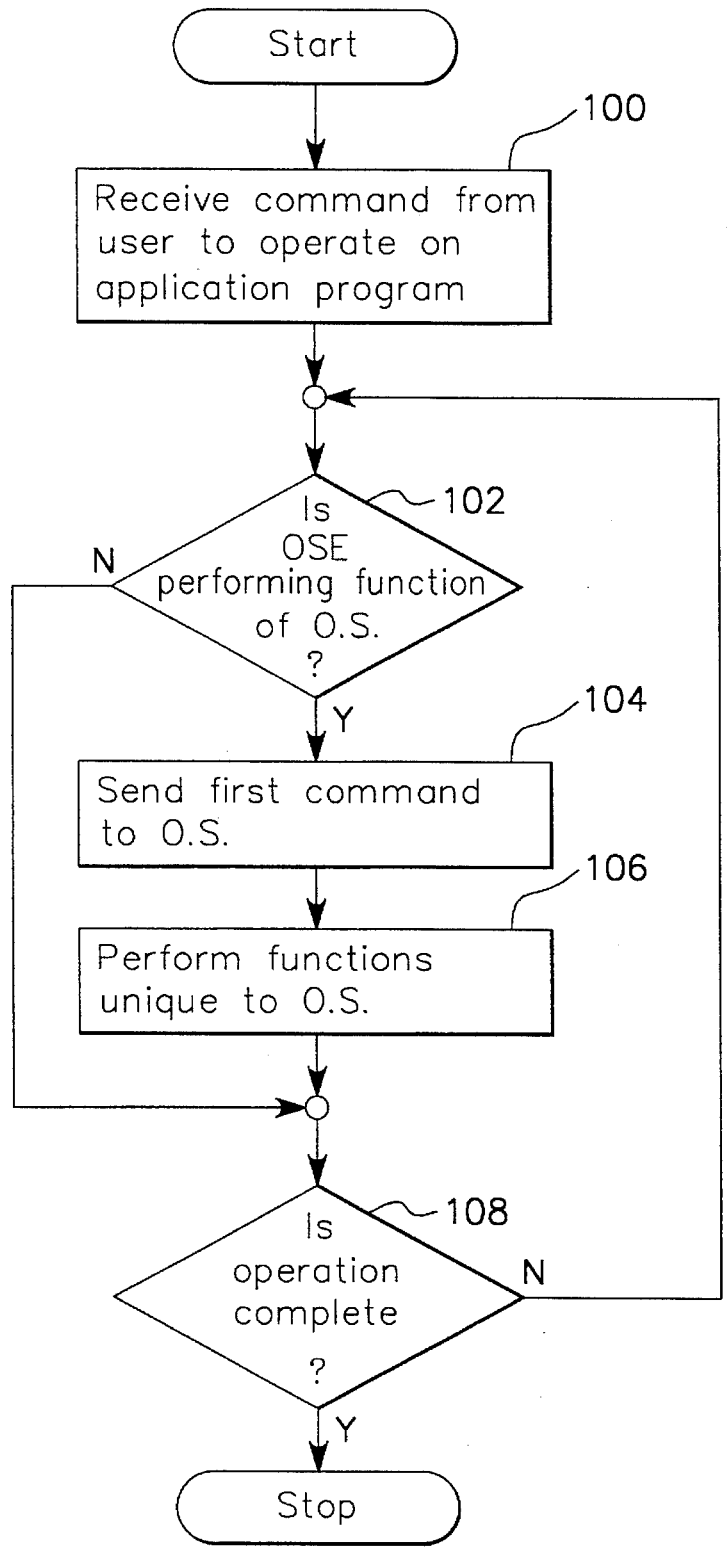
FIG. 1 is a decision flow diagram illustrating the method of the subject invention.

The present invention provides a method for interfacing an operating system extension 50 with a personal computer 10. The personal computer includes a memory 30 having memory locations with associated addresses that range from 0 to N for storing application programs 60 and an operating system (O.S.) 40 for interfacing the application programs with the personal computer. The personal computer 10 also includes a microprocessor 20 for running programs. The operating system extension is constructed to load a certain class of application programs into the memory space for execution by the operating system of the personal computer. Examples of operating system extensions include some networking systems and memory managers. Other examples of operating system extensions will readily become apparent to those skilled in the art.

In a presently preferred embodiment of the invention, the personal computer 10 is configured with its operating system 40 in the high memory area of its memory space 30. The operating system of the personal computer is configured to revise application programs when they are loaded into its memory space so that the application programs will execute properly with the personal computer as configured. As an example, the operating system of the personal computer is configured to revise the application program by associating a version number of the operating system with the application program loaded in its memory space so that the application program will recognize the operating system by the version number. As another example, the operating system is configured to revise the application program by replacing a predetermined set of instructions and data with an alternate set of instructions and data so that the application program will operate properly when loaded into the lowest available region of the memory space of the operating system extension. The particular revisions made to the application programs by the operating system of the subject invention, and the reasons therefor, are discussed in greater detail in U.S. patent application Ser. No. 07/847,525, entitled *Method For Storing Programs,* by Eric Straub, et al., referenced above.

In accordance with the subject invention, the operating system of the personal computer is interfaced with an operating system extension to enable the operating system to perform functions unique to the operating system of the personal computer when the operating system extension is performing functions usually performed by the operating system of the personal computer. An example of the functions referenced herein are the revisions to the application program discussed above and in the above referenced U.S. patent application Ser. No. 07/847,525, entitled *Method For Storing Programs,* by Eric Straub, et al. now U.S. Pat. No. 5,430,878. However, those skilled in the art will recognize that the method of the present invention could be used to permit the operating system of the personal computer to perform any function unique to the operating system.

A description of the invention will be provided by reference to FIG. 1. Therein, the method is initiated any time a command is received from the user of the personal computer to instruct the operating system extension to operate on an application program, step 100. The command may be a command to load an application program, a command to begin execution of an application program, or any other command for the operating system extension to perform an operation on the application program. Although the command is issued by the user of the personal computer, the command is transferred to the operating system extension for the operating system extension to perform the operation on the application program.

Prior to executing an application program, personal computers typically read the application program from a fixed storage medium. As examples, application programs may be stored on floppy disks, magnetic tape, the computer's hard drive, etc. To execute the program, the personal computer copies the program from the fixed storage medium into its computer memory. This allows the personal computer to execute the program very quickly since the personal computer can access its computer memory much quicker than it can access a fixed storage medium.

In accordance with the subject invention, the personal computer examines at least a portion of the image of the program for information indicating compatibility of the program with the configuration of the personal computer and, revises the image of the program if necessary to enable the program to be operable with the personal computer as configured.

One aspect of the invention is to examine the image of the program for information identifying the program. Most application programs rely upon information provided by the personal computer to determine whether the program is operable, or compatible, with the particular configuration of the personal computer. As an example, some application programs rely upon the version number of the operating system (OS) of the personal computer to determine whether the program is compatible with the personal computer. If the operating system of a particular computer configuration, or a version of the operating system of the computer configuration, was not in existence at the time the application program was released, then the application program may not recognize the operating system by its version number and, therefore, will not be able to properly determine that it is compatible with the operating system. The subject invention provides a method for revising the image of the application program to accurately indicate compatibility of the application program with the operating system.

Another aspect of the invention is to examine the image of the program to determine whether the program is capable of being properly executed with the configuration of the personal computer. Since some personal computers are configured to load programs into the lowest available region of the computer's memory space, and since some programs are not capable of being operated properly from this region, a personal computer so configured must determine whether the program can be properly operated from the lowest available region of its memory space. This determination is made by examining at least a portion of the program for a predetermined set of instructions. If the predetermined set of instructions are found, then the personal computer determines that the program is not capable of being executed properly and revises the image of the program so that the program is operable with the configuration of the subject personal computer.

While the operating system extension is performing functions to complete the requested operation on the application program, it determines whether it is performing a function typically performed by the operating system of the personal computer, step 102. If it is, it sends a function command to the operating system of the personal computer, step 104, to identify the function being performed by the operating system extension and to enable the operating system of the personal computer to perform any unique functions associated with the identified function. The operating system of the personal computer responds to the function command to perform any functions unique to the operating system, associated with the function being performed by the operating system extension, and necessary for proper operation of the application program, step 106. After the operating system of the personal has completed the functions of step 106, the operating system extension continues the performance of the requested operation, step 108.

Figure 2:
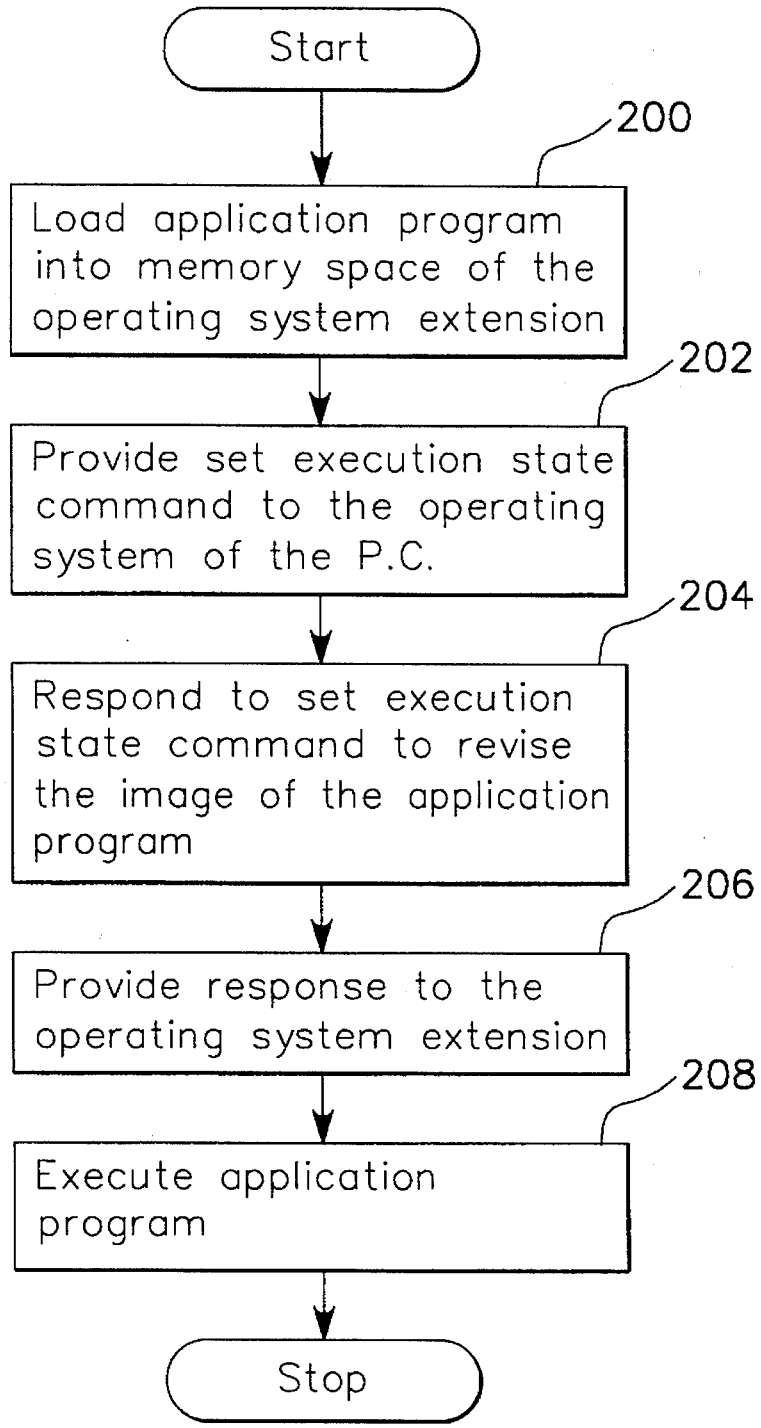
FIG. 2 is a decision flow diagram illustrating a presently preferred embodiment of the method of the present invention.
Figure 3:
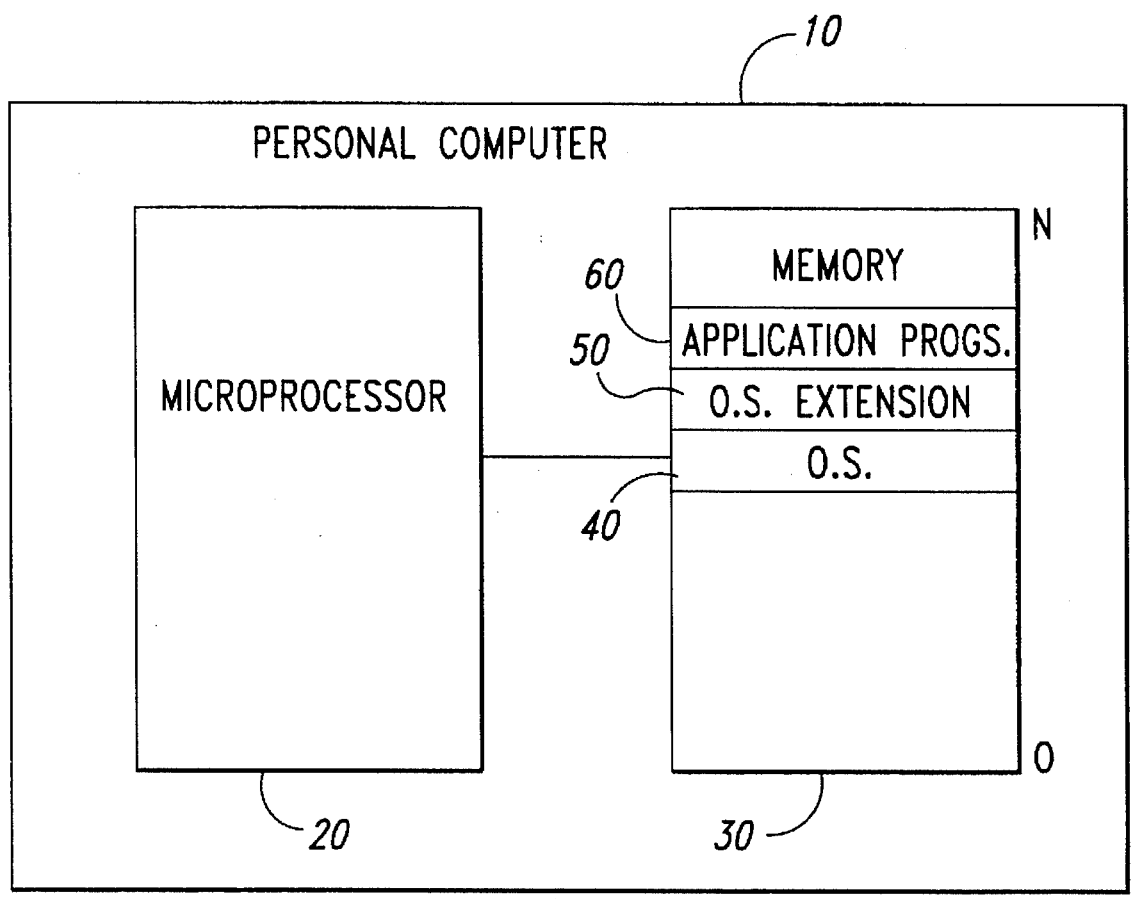
FIG. 3 is a block diagram of a personal computer that is suitable for practicing the preferred embodiment of the present invention.

As discussed above, the present invention is applicable to any function performed by the operating system extension that is typically performed by the operating system of the personal computer. In a presently preferred embodiment of the invention, the method is used when the operating system extension loads an application program into memory. In this embodiment, the operating system extension loads an application program, to create an image of the application program, step 200, FIG. 2. Thereafter, the application program provides the function command, discussed above by reference to step 104 of FIG. 1, to the operating system of the personal computer, step 202. As illustrated in FIG. 2, the particular command to indicate that the operating system extension has loaded an application program is the set execution state command. Those skilled in the art will recognize that different function commands will be provided by the operating system extension to identify other functions of the operating system of the personal computer that the operating system extension may be requested to perform.

The operating system of the personal computer responds to the set execution state command to revise the image of the application program so that the application program will be compatible with the configuration of the personal computer, step 204. As discussed above, the operating system of the personal computer is capable of revising the application program by associating a version number of the operating system with the application program so that the application program will recognize the operating system by the associated version number. The operating system is also capable of revising the application program by replacing a predetermined set of instructions and data with an alternate set of instructions and data so that the application program will operate properly when loaded into the lowest available region of the memory space of the operating system extension.

Initially, a table of program names and version numbers is stored in the personal computer. Preferably, the storage of the table is done when the personal computer is first configured or designed, however, the table may be stored, or revised, at any time. The table is an index of program names and version numbers of operating systems that indicate compatibility of the program with the operating system of the personal computer. In a presently preferred embodiment of the invention, the personal computer is configured with DOS version 5. The table will contain the names of programs and prior version numbers of DOS with which the program is compatible. Those skilled in the art will recognize, however, that a wide variety of information may be stored in the table to identify the application programs and to associate the application programs with information to indicate compatibility of the application program with the configuration of the personal computer.

After the program is loaded into the memory space of the personal computer, as described above by reference, the personal computer reads the name of the program. In the embodiment of the invention described herein, the name of the program is the information used by the personal computer to identify the program and determine whether the program will recognize the operating system of the personal computer, however, other information could be used for this purpose. Thereafter, the personal computer references the table to obtain the version number associated with the name of the program and stores this version number in the program segment prefix (PSP) of the image of the program.

The image of the program is now revised so that the program will be compatible with the configuration of the personal computer. The program may then be executed. During execution of the program, the personal computer determines whether the program is requesting the version number of the operating system and, if so, reports the version number stored in the program segment prefix (PSP) of the image of the program. In this manner, the information provided to the program will properly indicate its compatibility with the configuration of the personal computer. The program execution continues in its normal manner.

It will be apparent to those skilled in the art that the table described above need not store compatibility information for programs that recognize the configuration of the personal computer. Further, some programs will not be compatible with the personal computer as configured. Accordingly, the table described above only contains the names, and compatible version numbers, for programs that are compatible with the configuration of the personal computer but may not recognize their compatibility by the version number. For all other programs, the actual version number of the operating system is stored in the program segment prefix, i.e., DOS 5 in the embodiment of the invention discussed above.

Generally, the subject method is provided for revising programs that are not operable with personal computers constructed to store the image of the program in the lowest available region of the computer's memory space. Two types of programs are currently known to include instructions and/or data that make the program inoperable when stored in the lowest available region of the computer's memory space, i.e., EXEPACKed programs and programs that use the Rational DOS Extenders.

Accordingly, the subject method determines whether the program is EXEPACKed and, if so, examines the image of the program for a first predetermined set of instructions and data and replaces the first predetermined set of instructions and data with a first alternate set of instructions and data. The first set of instructions and data are those that render the program inoperable when stored in the lowest available region of the computer's memory space. The first alternate set of instructions and data are selected to perform the same function as the first set of instructions and data are designed to do when the program is stored in the upper region of the computer's memory space.

Similarly, the method determines whether the program uses the Rational DOS Extenders and, if so, examines the image of the program for a second predetermined set of instructions and data and replaces the second predetermined set of instructions and data with a second alternate set of instructions and data. The second set of instructions and data are those that render a program that uses the Rational DOS Extenders inoperable when stored in the lowest available region of the computer's memory space. The second alternate set of instructions and data are selected to perform the same function as the second set of instructions and data are designed to do when the program is stored in the upper region of the computer's memory space.

After the operating system of the personal computer has completed its revisions to the application program, the operating system will provide a response to the operating system extension to indicate that the revisions are complete, step 206, so that the operating system extension can complete the loading operation and the execution of the application program may begin, step 208. Those skilled in the art will recognize that different responses may be provided to indicated the completion of different functions. Also, it is possible that the operating system of the personal computer may respond by issuing a command to the operating system extension to take some action before proceeding with the requested operation.

Further, it will be apparent to those skilled in the art that, depending upon the operation being performed by the operating system extension, and the functions to be performed by the operating system of the personal computer, it may be desirable to provide the function command prior to, during, or after performance of the operation. Further, those skilled in the art will recognize that since different function commands are provided to indicate different operations being performed by the operating system extension, the function command can further indicate the completion status of the operation.

It will be apparent to those skilled in the art that although only several presently preferred embodiments of the invention have been described in detail herein, many modifications and variations may be provided without departing from the true scope and spirit of the invention. Accordingly, the invention is not limited except as by the appended claims.

We claim:

1. In a computer system having a processor for running an operating system that includes a function, an operating system extension and an application program, and a memory, said memory having memory locations with associated addresses, a method comprising the steps of:

(a) with said operating system, allocating a range of addresses in said memory for use by said operating system extension;

(b) with said operating system extension, loading said application program into said range of addresses allocated in said memory that are allocated to said operating system extension to create a memory image of said application program in said memory;

(c) calling said function in said operating system from said operating system extension after said application program has been loaded into said memory that is allocated to said operating system extension; and (d) performing said function in said operating system to revise said memory image of said application program to ensure compatibility of said application program with said computer system, said performing including the sub-step of:

with said operating system, associating information identifying a compatible configuration of said computer system with said memory image of said application program so that when requested, said information is provided to said application program so that said application program recognizes that it is compatible with said computer system.

2. In a computer system having a processor for running an operating system that includes a function, an operating system extension and an application program, and a memory, said memory having memory locations with associated addresses, a method comprising the steps of:

(a) with said operating system, allocating a range of addresses in said memory for use by said operating system extension;

(b) with said operating system extension, loading said application program into said range of addresses allocated in said memory that are allocated to said operating system extension to create a memory image of said application program in said memory;

(c) calling said function in said operating system from said operating system extension after said application program has been loaded into said memory that is allocated to said operating system extension; and (d) performing said function in said operating system to revise said memory image of said application program to ensure compatibility of said application program with said computer system, said performing including the sub-step of:

with said operating system, associating information identifying a compatible version of said operating system with said memory image of said application program so that when requested, said information is provided to said application program and said application program recognizes that it is compatible with said operating system.

3. A computer system comprising:

a processor for running an application program, an operating system and an operating system extension;

a memory having locations with addresses for storing the operating system and the operating system extension;

the operating system including:

a memory allocator for allocating a range of addresses for locations in the memory for storing the application program to create a memory image of the application program;

a function for revising the memory image of the application program to ensure compatibility of the application program with the computer system by associating information identifying a compatible configuration of said computer system with said memory image of said application program so that when requested, said information is provided to said application program so that said application program recognizes that it is compatible with said computer system;

the operating system extension including:

a loading mechanism for loading the application program into the allocated range of addresses in the memory; and means for calling the function for revising the memory image of the application program in the operating system after loading the application program into the allocated range of addresses.

4. A computer system comprising:

a processor for running an application program, an operating system and an operating system extension;

a memory having locations with addresses for storing the operating system and the operating system extension;

the operating system including:

a memory allocator for allocating a range of addresses for locations in the memory for storing the application program to create a memory image of the application program;

a function for revising the memory image of the application program to ensure compatibility of the application program with the computer system by associating information identifying a compatible version of said operating system with said memory image of said application program so that when requested, said information is provided to said application program and said application program recognizes that it is compatible with said operating system;

the operating system extension including:

a loading mechanism for loading the application program into the allocated range of addresses in the memory; and means for calling the function for revising the memory image of the application program in the operating system after loading the application program into the allocated range of addresses.

* * * * *